United States Patent
Ulrich

(10) Patent No.: US 7,902,484 B2
(45) Date of Patent: Mar. 8, 2011

(54) METHOD AND APPARATUS FOR REMOTELY CONTROLLING A WELDING SYSTEM

(75) Inventor: James F. Ulrich, Grayslake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 224 days.

(21) Appl. No.: 12/020,394

(22) Filed: Jan. 25, 2008

(65) Prior Publication Data

US 2008/0116176 A1 May 22, 2008

Related U.S. Application Data

(62) Division of application No. 10/904,172, filed on Oct. 27, 2004, now Pat. No. 7,381,922.

(51) Int. Cl.
*B23K 9/10* (2006.01)

(52) U.S. Cl. ..................................... 219/132; 219/130.1

(58) Field of Classification Search ............... 219/130.1, 219/132, 137.2, 137.31, 137.63, 137.9
See application file for complete search history.

(56) References Cited

U.S. PATENT DOCUMENTS

| | | | |
|---|---|---|---|
| 2,043,331 A | 6/1936 | Notvest | |
| 2,175,891 A | 10/1939 | Graham | |
| 2,526,597 A | 10/1950 | Winslow | |
| 2,642,515 A | 6/1953 | Bagg | |
| 4,051,344 A | 9/1977 | Robbins | |
| 4,216,367 A | 8/1980 | Risberg | |
| 4,216,368 A | 8/1980 | Delay | |
| 4,227,066 A | 10/1980 | Bulwidas, Jr. | |
| 4,247,752 A | 1/1981 | Stringer | |
| 4,266,114 A | 5/1981 | Hansen | |
| 4,410,789 A | 10/1983 | Story | |
| 4,467,174 A | 8/1984 | Gilliland | |
| 4,508,954 A | 4/1985 | Kroll | |
| 4,521,672 A | 6/1985 | Fronius | |
| 4,641,292 A | 2/1987 | Tunnell et al. | |
| 4,767,908 A | 8/1988 | Dallavalle et al. | |
| 5,039,835 A | 8/1991 | Schwiete | |
| 5,043,557 A | 8/1991 | Tabata et al. | |
| 5,276,305 A | 1/1994 | Hsien | |
| 5,406,050 A | 4/1995 | Macomber et al. | |
| 6,040,555 A | 3/2000 | Tiller et al. | |
| 6,103,994 A | 8/2000 | DeCoster et al. | |
| 6,156,999 A | 12/2000 | Ignatchenko et al. | |
| 6,477,605 B1 * | 11/2002 | Taki et al. | 710/302 |
| 6,570,132 B1 | 5/2003 | Brunner et al. | |
| 6,624,388 B1 | 9/2003 | Blankenship et al. | |
| 6,781,095 B2 | 8/2004 | Hayes et al. | |

(Continued)

FOREIGN PATENT DOCUMENTS

| | | |
|---|---|---|
| EP | 0575082 A2 | 12/1993 |
| JP | 61137675 | 6/1986 |
| JP | 04162964 | 6/1992 |
| JP | 04162966 | 6/1992 |

(Continued)

*Primary Examiner* — Stephen J Ralis
(74) *Attorney, Agent, or Firm* — Fletcher Yoder P.C.

(57) ABSTRACT

The present invention is directed to a remote control that uses a welding circuit to transfer control information to a welding power source. The information to be communicated to the power source includes welding power source output command information (amperage/voltage control), welding circuit on/off information (power source output contactor control), and power source mode control (constant voltage/constant current). The control information may be transmitted in a serial communication and/or encoded using frequency and or voltage coding. The control information may be transmitted during dedicated transmission intervals or as an offset to an open circuit voltage between the power source and wire feeder.

18 Claims, 5 Drawing Sheets

U.S. PATENT DOCUMENTS

| | | |
|---|---|---|
| 6,906,285 B2 | 6/2005 | Zucker et al. |
| 6,909,285 B2 | 6/2005 | Jordan et al. |
| 7,205,503 B2 | 4/2007 | Reynolds et al. |
| 2006/0027546 A1 | 2/2006 | Reynolds et al. |
| 2006/0076335 A1 | 4/2006 | Reynolds et al. |

FOREIGN PATENT DOCUMENTS

| | | | |
|---|---|---|---|
| JP | 2003154455 | | 5/2003 |
| JP | 2003191075 A | * | 7/2003 |
| JP | 2003191075 | | 8/2003 |
| SU | 1269937 A | * | 11/1986 |

* cited by examiner

METHOD AND APPARATUS FOR REMOTELY CONTROLLING A WELDING SYSTEM

CROSS REFERENCE TO RELATED APPLICATION

The present application is a divisional and claims priority of U.S. patent application Ser. No. 10/904,172 filed Oct. 27, 2004, the disclosure of which is incorporated herein.

BACKGROUND OF THE INVENTION

The present invention relates generally to welding machines and, more particularly, to a method and apparatus for remotely controlling operation of a power source of a welding-type system through the transmission of control signals across a weld cable.

MIG welding, formerly known as Gas Metal Arc Welding (GMAW), combines the techniques and advantages of TIG welding's inert gas shielding with a continuous, consumable wire electrode. An electrical arc is created between the continuous, consumable wire electrode and a workpiece. As such, the consumable wire functions as the electrode in the weld circuit as well as the source of filler metal. MIG welding is a relatively simple process that allows an operator to concentrate on arc control. MIG welding may be used to weld most commercial metals and alloys including steel, aluminum, and stainless steel. Moreover, the travel speed and the deposition rates in MIG welding may be much higher than those typically associated with either Gas Tungsten Arc Welding (TIG) or Shielded Metal Arc Welding (stick) thereby making MIG welding a more efficient welding process. Additionally, by continuously feeding the consumable wire to the weld, electrode changing is minimized and as such, weld effects caused by interruptions in the welding process are reduced. The MIG welding process also produces very little or no slag, the arc and weld pool are clearly visible during welding, and post-weld clean-up is typically minimized. Another advantage of MIG welding is that it can be done in most positions which can be an asset for manufacturing and repair work where vertical or overhead welding may be required.

A wire feeder is operationally connected to the power source and is designed to deliver consumable wire to a weld. To further enhance the operability of the wire feeder of a MIG welding system, known welding systems have connected the power source and the wire feeder to one another across a dedicated control cable that is in addition to a dedicated weld cable such that control signals defining the operational parameters of the power source are transmitted or fed back from the wire feeder to the power source, generally referred to as remote control.

One type of remote control device is used to regulate the operational welding parameters, and switch the welding power source output ON and OFF as well as change the power source mode via a pendant that connects to the power source by a multi-conductor cable. The solution is schematically illustrated in FIG. 1A. A wire feeder 2A is connected to a power source 4A by a control cable 6A that includes a 14-pin connector. The cable 6A used to transmit operational information to, and in some cases, from the power source may incorporate 2 to 14 conductors depending on how many functions are to be controlled. Separately connected between the power source 4A and wire feeder 2A is a high voltage weld cable 8A that delivers welding power to the wire feeder and creates a voltage potential between an electrode and a workpiece.

A significant drawback to this control cable-based scheme is that the control cable is typically fragile relative to the welding cables designed to carry high currents at high voltages. Welding machines are commonly used at construction sites or shipyards where it is not uncommon for the welding machines to be periodically relocated or surrounded by other mobile heavy equipment operating in the same area. As such, the remote control cable can become damaged by being crushed or snagged from contact with surrounding machines and/or traffic. This can cause damage to the wire feeder and/or the welding power source if internal power conductors become shorted to signal leads that are connected to sensitive signal level circuitry.

Referring now to FIG. 1B, another remote controlled system includes a radio transmitter type remote control. This approach has several disadvantages. First, electric arc welding can create radio frequency interference that negatively affects the communication between a transceiver 9A of the wire feeder 2B and the transceiver 9B of the power source 4B. Second, if the system is used inside metal structures such as tanks, ships, or large aircraft, the radio link can be lost due to the shielding effect of the metallic surroundings. Third, if multiple welding stations use a radio link for remote control, each control loop would require a separate security code to prevent cross-talk or mis-transmission of control signals to the wrong welding machine.

Another remote control solution is described in U.S. Ser. No. 10/604,482, which is assigned to the Assignee of the present application. Notwithstanding the numerous advancements achieved with the invention of the aforementioned pending application, such a system relies upon pulse width modulation to remotely transmit operational data from a wire feeder to a power source across a weld cable. By using pulse width modulated signals to remotely control operation of a power source, the amount of data as well as variability in the types of data that could be transmitted between the wire feeder and a power source is limited when compared to that which may be achieved with serialized or encoded communications. Further, with the system described in the aforementioned pending application, the wire feeder is constructed without a contactor and thus requires an internal DC power supply to power the electronics of the wire feeder. That is, the invention of the above-referenced application teaches the avoidance of an open circuit voltage (OCV) between the wire feeder and power source. As a result, absent a DC power supply, the wire feeder cannot be minimally powered so as to communicate with the power source to initiate the welding process.

It is therefore desirable to design a remote controlled welding machine that receives command signals from a wire feeder across a weld cable to control or otherwise regulate operation of a power source. It would also be desirable to design a remote controlled welding system having with a battery-less wire feeder whereupon electronics of the wire feeder are powered in a conventional manner, but the OCV between the wire feeder and power source is used as the backbone of a communications link between the wire feeder and power source for the transmission of control commands.

BRIEF DESCRIPTION OF THE INVENTION

The present invention provides a system and method of remotely controlling operation of a welding machine via control commands transmitted across a weld cable connecting the welding machine to a peripheral, such as a wire feeder, that overcomes the aforementioned drawbacks.

A remote control uses a weld cable as a communication link to transfer control information to a welding power source. The information to be communicated to the power source includes welding power source output command information (amperage/voltage control), welding circuit on/off information (power source output contactor control), power source mode control (constant voltage/constant current), and the like. The control information may be transmitted in a serial communication and/or encoded using frequency and or voltage decoding. The control information may be transmitted during dedicated transmission intervals or as an offset to an OCV between the power source and wire feeder.

Therefore, in accordance with one aspect, the present invention includes a welding system having a battery-less wire feeder designed to feed consumable material to a weld and a power source designed to provide a welding power and having a power output connected to the battery-less wire feeder via a weld cable. The welding system includes a controller to periodically disable the power output and receive power source control commands from the battery-less wire feeder across the weld cable when the power output is disabled.

In accordance with another aspect, a MIG welder is disclosed and includes a wire feeder designed to deliver consumable welding wire to a weld. A power source is connected to the wire feeder via a weld cable. The weld cable is designed to carry an OCV thereacross during standby operation of the wire feeder. The MIG welder includes a communications link between the wire feeder and the power source extending across the weld cable. The communications link is designed to translate control commands between the power source and wire feeder manifested in a voltage offset from the OCV.

According to yet another aspect, the present invention includes a method of remotely controlling a welding process. The method includes the steps of periodically disabling an output of a power source designed to provide welding power to a weld and receiving control commands from a wire feeder remote from the power source when the output of the power source is disabled. The method further includes the step of, following reception of the control commands, re-enabling the output of the power source to provide power to the weld at a level consistent with that embodied in the control commands.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention will be described with respect to regulation of a power source and a wire feeder of a MIG welding system based on feedback provided from a transceiver remote from the power source to a receiver incorporated within the power source. However, the present invention is equivalently applicable with power sources of TIG, stick, flux cored, and the like welding systems. Moreover, the present invention is also applicable with non-welding, high power systems such as plasma cutters and induction heaters.

Figure 1A:
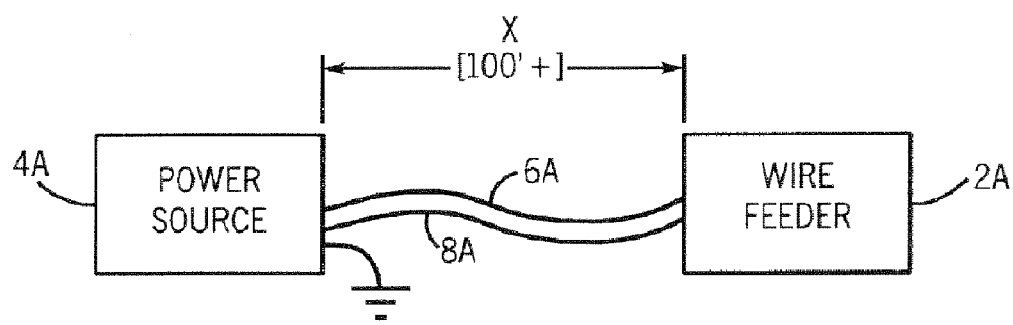
FIGS. 1A-1B are schematic block diagrams illustrating examples of known remotely controlled welding and wire feeder systems.
Figure 1B:
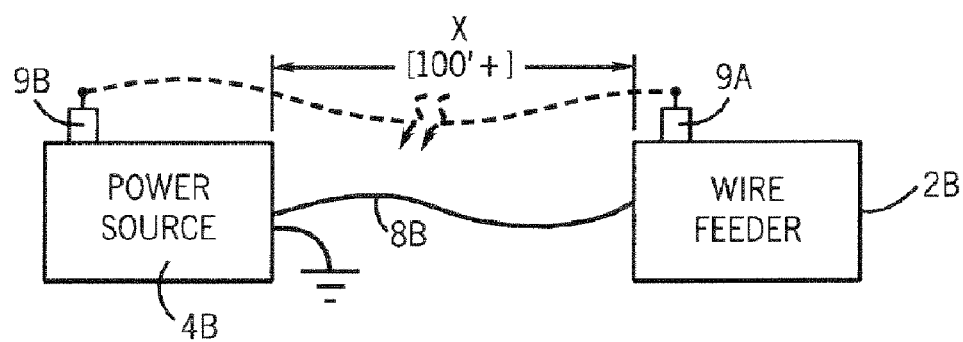
Figure 2:
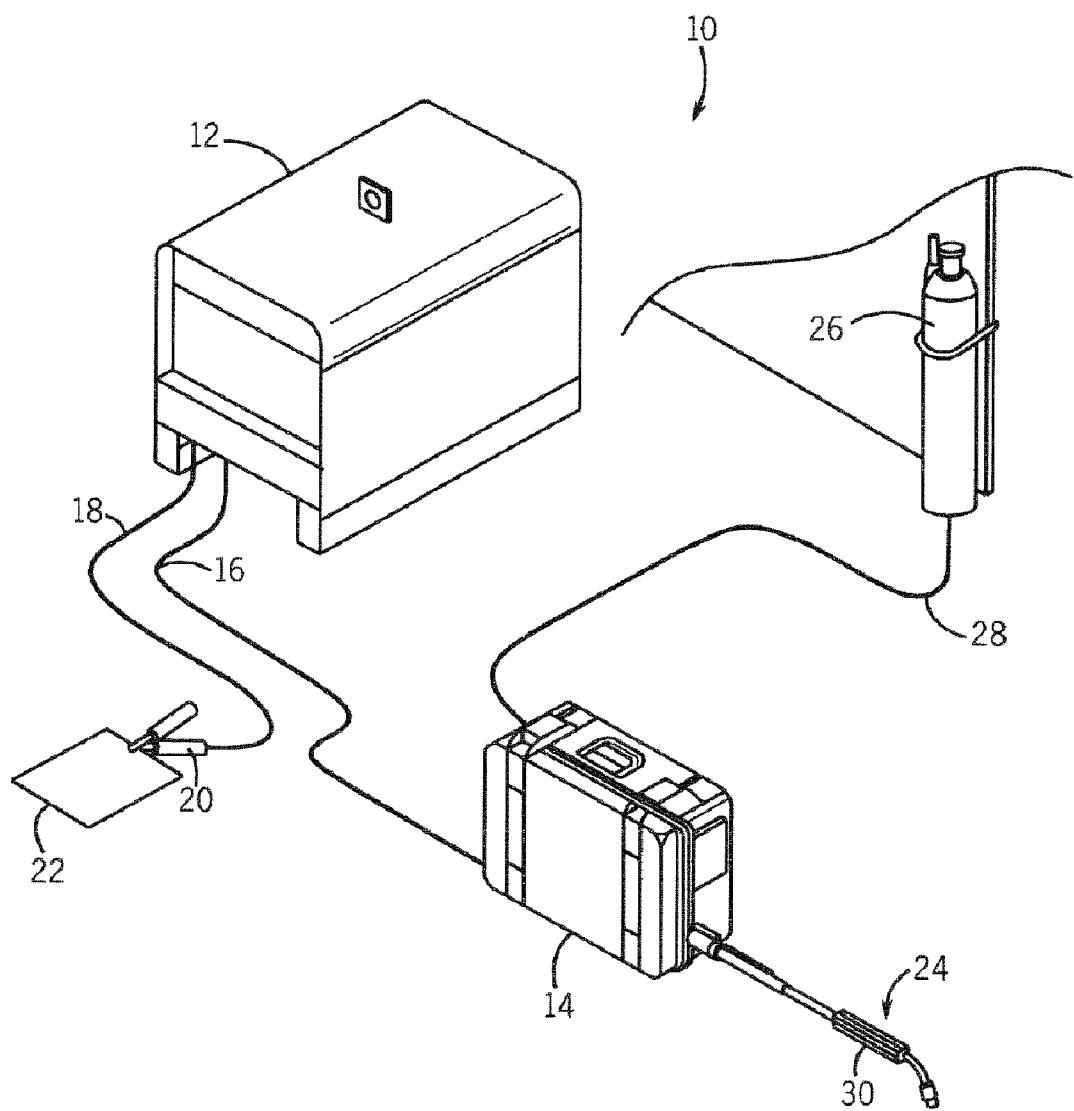
FIG. 2 is a pictorial view of a welding system in accordance with one aspect of the present invention.
Figure 3:
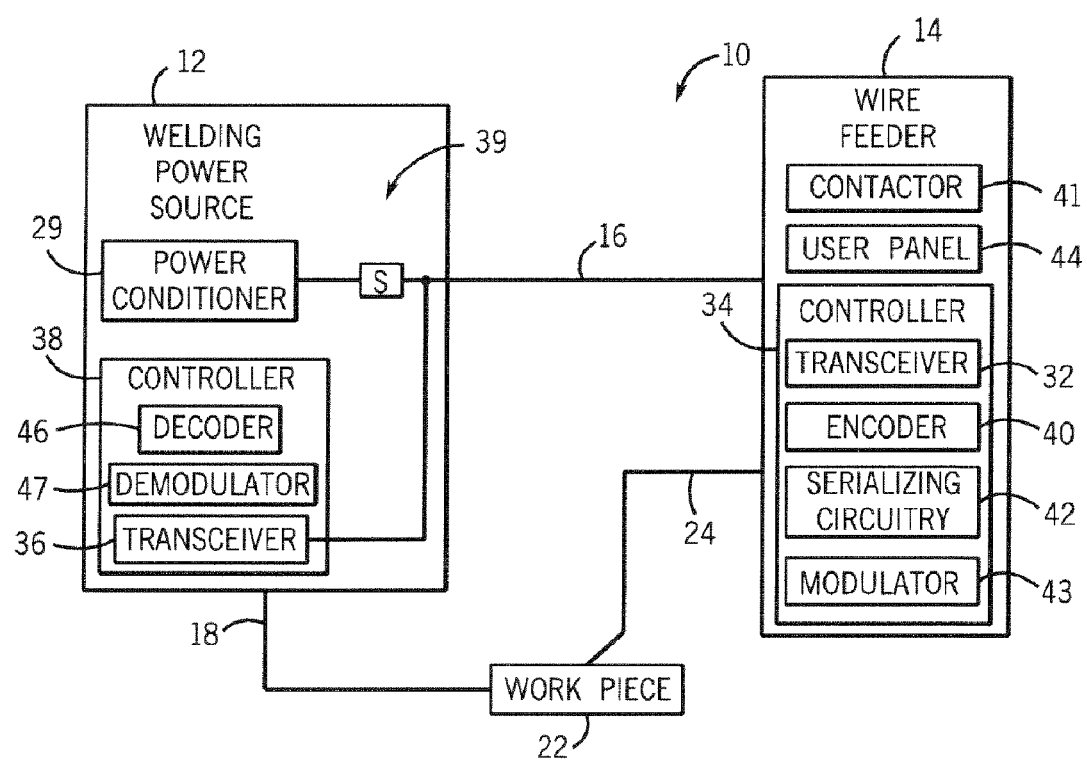
FIG. 3 is a schematic of the welding system illustrated in FIG. 2.

Referring to FIGS. 2 and 3, a MIG welding system 10 includes a welding power source 12 designed to supply power to a wire feeder 14 through a weld cable 16. The power source is designed to run in one of a number of modes including constant voltage (CV) and constant current (CC). Also connected to the power source is a secondary work weld cable 18 that connects the power source to a clamp 20 designed to receive cable 18 to workpiece 22. Also connected to wire feeder 14 is a welding gun or torch 24 configured to supply consumable welding wire to a weld. Welding system 10 may further include a gas cylinder 26 connected to wire feeder 14 such that shielding gas can be provided through gas hose 28 for the MIG welding process.

Power source 12 is designed to condition raw power supplied from a utility line or engine driven power supply and output power usable by the welding process. As such, power source 12 includes one or more transformer assemblies or power conditioner 29 to condition the raw power into a usable form for welding. The output of the power source is generally controlled by a controller 38 and associated operational circuitry that regulates the secondary or output side of the power conditioning components 29. As such, the power source may provide a welding output when the secondary power circuit 39 and the contactor 41 or other power switching device is closed to a conductive state. As will be described in greater detail below, switch device 39 may be regulated such that a secondary or welding power output is periodically not provided to wire feeder 14 across weld cable 16 during non-welding intervals. In this regard, the typically otherwise present OCV between the power source and wire feeder is temporarily lost. During these moments of disablement of the power source output, transceiver 36 will await control commands across weld cable 16 which then operates as the backbone of a communication link between the wire feeder and the power source.

Torch 24 is equipped with a pushbutton trigger 30 that when depressed causes contactor 41 of the wire feeder to close and make a welding voltage available to the torch. As shown in FIGS. 2 and 3, a separate control cord connecting the wire feeder and power source to one another is avoided.

The incorporation of a transceiver within wire feeder 14 that communicates with a transceiver in power source 12 directly through weld cable 16 eliminates the need for a separate control/power cable. The control cable adds to the complexity, weight, and overall cost of the welding system. Additionally, as previously noted, the control cord is typically less durable than the welding cables and, as such, is prone to nicks and snags typically associated with industrial locations.

This invention includes a pair of transceivers 36, 32: one in the power source 12 and one in the wire feeder 14. In this regard, bi-directional communication is supported between the wire feeder and the power source. It is contemplated, however, that the wire feeder may be equipped with a transmitter and the power source with a receiver to support uni-directional communication between the two components.

The transceiver in the wire feeder is designed to transmit serialized and modulated packets of feedback or commands to a transceiver 36 in the power source 12 across the weld cable 16.

The signal includes information regarding desired operational parameters of the wire feeder 14 and instructs the transceiver 36 of the power source 12 to set the magnitude of the output of the welding power source (volts or amperes), the mode of the welding power source (CC or CV), and wire feed speed among other parameters. The transceiver 32 is also configured to transmit commands regarding JOG and PURGE functions. That is, when the JOG button is pushed on the wire feeder 14, the transmit automatically repeats the minimum reference command each time the open circuit voltage of the welding power source falls to zero. In accordance with known wire feeder construction, the operator may select operational parameters on a user panel of the wire feeder. In a further embodiment, the user panel may be integrated with the electrode holder or torch 24 to allow user control of the welding process without leaving the weld.

Referring again to FIG. 3, the welding system 10 is designed to provide serialized and/or encoded communication between the wire feeder 14 and power source 12. In this regard, controller 34 of wire feeder 14 also includes an encoder 40, serializing circuitry 42, and modulator 43. Serializing circuitry 42 is designed to serialize communications between the wire feeder and the power source based on user input to a user panel 44 and for feedback provided from the weld. Encoder 40 is designed to encode the serialized transmission for improved and more efficient transmission to the power source 12. Modulator 43 is designed to modulate the serialized data before transmission. A number of transmission techniques is envisioned including, but not limited to spread spectrum and psuedo-random sequenced using amplitude and/or phase-shifting. Spread spectrum technology is a method of communication that is typically implemented to secure communications and/or to overcome narrow-band constraints of a transmission line, i.e. a weld-cable. It is also contemplated that voltage and frequency level encoding may be used.

As described above, user panel 44 is designed to receive discrete inputs from an operator that collectively define operation of a welding process. As wire feeder 14 supports digitized control of the welding process, the operator is able to input, with a certain degree of specificity, exact operating parameters via user panel 44. However, as welding system 10 is a remotely controlled system, controller 34 of wire feeder 14 receives the user inputs whereupon those inputs are fed to serializing circuit 42 to arrange the user input data into a serialized communication that supports streamlined transmission of the control commands across weld cable 16.

Power source 12 also includes a decoder 46 and demodulator 47 that are matched with the encoder 40 of the wire feeder so as to demodulate and decipher the encoded signal received from transceiver 32 across weld cable 16. Based on the deciphered commands, controller 38 will regulate operation of power source 12 in accordance with the user inputs to the wire feeder 14. In a further embodiment, each transmission includes a checksum that allows decoder 46 to verify the accuracy of the transmitted data based on the particular encoding used.

Figure 4:
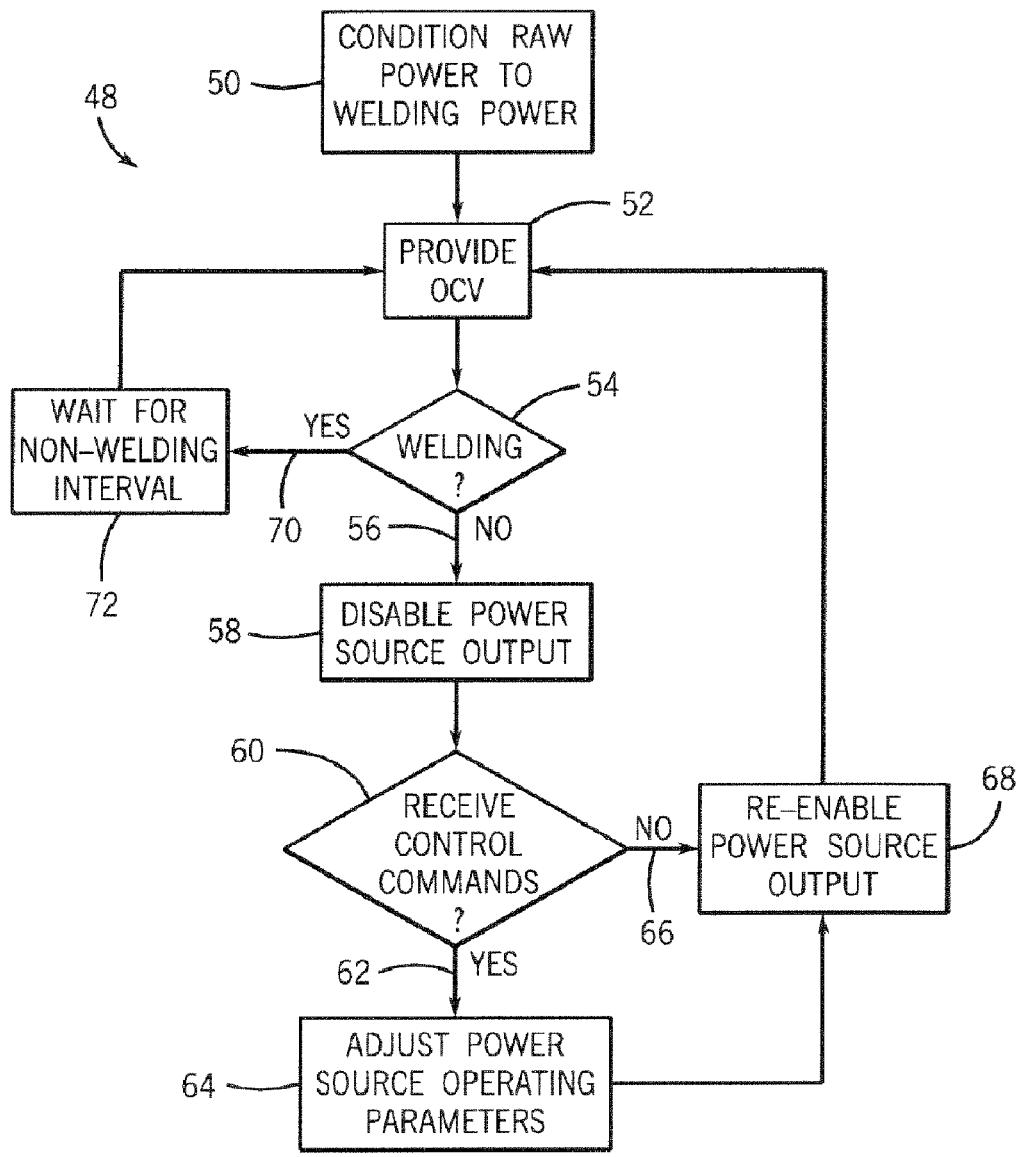
FIG. 4 is a flow chart setting forth the steps of remotely controlling a power source in accordance with one aspect of the present invention.

Referring now to FIG. 4, a flow chart is shown setting forth steps of remotely controlling a welding-type power source according to one embodiment of the present invention. Preferably, the power source controller 38 carries out the steps of process 48 through the execution of one or more programs stored on a readable storage medium (not shown) in the power source. Process 48 begins at 50 with powering up at 52 of the power source to provide an OCV between the power source and the wire feeder across the weld cable. This OCV is provided in a conventional manner. Specifically, the power conditioning components, i.e. transformer, of the power source receives a raw power input from either a utility source or an engine-driven generator and conditions that power input into a form usable by a welding-type process. The OCV will be maintained between the wire feeder and the power source across the weld cable and used to power the electronics of the wire feeder when the wire feeder is in a standby mode. In a conventional manner, when the contactor or other switch mechanism in the wire feeder is closed, the voltage across the weld cable will be available at the welding torch or gun for creation of an arc between an electrode, i.e. consumable wire, and the workpiece. When this welding circuit is formed, the wire feeder as well as the power source preferably operate consistent with the parameters identified by the operator and transmitted from the wire feeder remotely to the power source. In this regard, process 48 is preferably executed prior to the commencement of a welding-type process and also re-executed during non-welding intervals.

That is, when the OCV is available across the weld cable at 52, the controller 38 will periodically disable the output of the power source at 58. It should be noted that, in a preferred embodiment, the power output is only disabled when a welding process is not actively being carried out at 54, 56. In this regard, the controller will determine that the contactor in the wire feeder has closed the welding circuit when the OCV is lost. While the power source output is disabled, the controller will query the receiver for control commands transmitted across the weld cable. That is, if the operator indirectly opens the contactor in the wire feeder to open the welding circuit, and the OCV between the wire feeder and power source is re-established, the controller of the power source will briefly disable the power source output 58 and await control commands 60 across the weld cable during this period of disablement. It is noted that the OCV will be briefly lost between the wire feeder and power source when the power source output is disabled. As such, any signal detected across the weld cable when the power source output is disabled will include control data from the wire feeder to the remote power source, and vice versa.

If control commands are received 60, 62 across the weld cable, the controller processes the control data and adjusts 64 operation of the power source accordingly. On the other hand, if control data is not received 60, 66 during the brief disablement of the power source output, the controller will cause re-enablement 68 of the power source output, which will cause re-establishment of the OCV at 52 between the wire feeder and power source. The re-establishment of the OCV at 52 will be maintained across the weld cable for delivery to the weld upon closure of the contactor in the wire feeder and triggering of the welding gun or torch. In this regard, upon commencement of a welding-type process 54, 70, the controller will enter a standby mode with respect to the reception of remote control commands and wait for a non-welding interval at 72. During the non-welding interval 72, the OCV will be re-established at 52 and the controller will re-execute steps 58-68 as described above following a re-verification that welding has not re-commenced at 54, 56. As such, during re-establishment of the OCV, the power source will be periodically disabled and during these periods of disablement, the transceiver will, if transmitted from the wire feeder, receive remote control commands to be processed and implemented by the controller in regulating operation of the power source.

FIG. 4 has been described with respect to the transmission of control commands from the wire feeder to the power source across the weld cable during non-welding intervals. It is also contemplated, however, that control commands may also be transmitted across the weld cable from the power source to the wire feeder during these non-welding intervals. In this regard, the present invention supports bi-directional communication between the power source and wire feeder. It is contemplated, however, that the advantages of the present invention may also be achieved with a uni-directional system.

Figure 5:
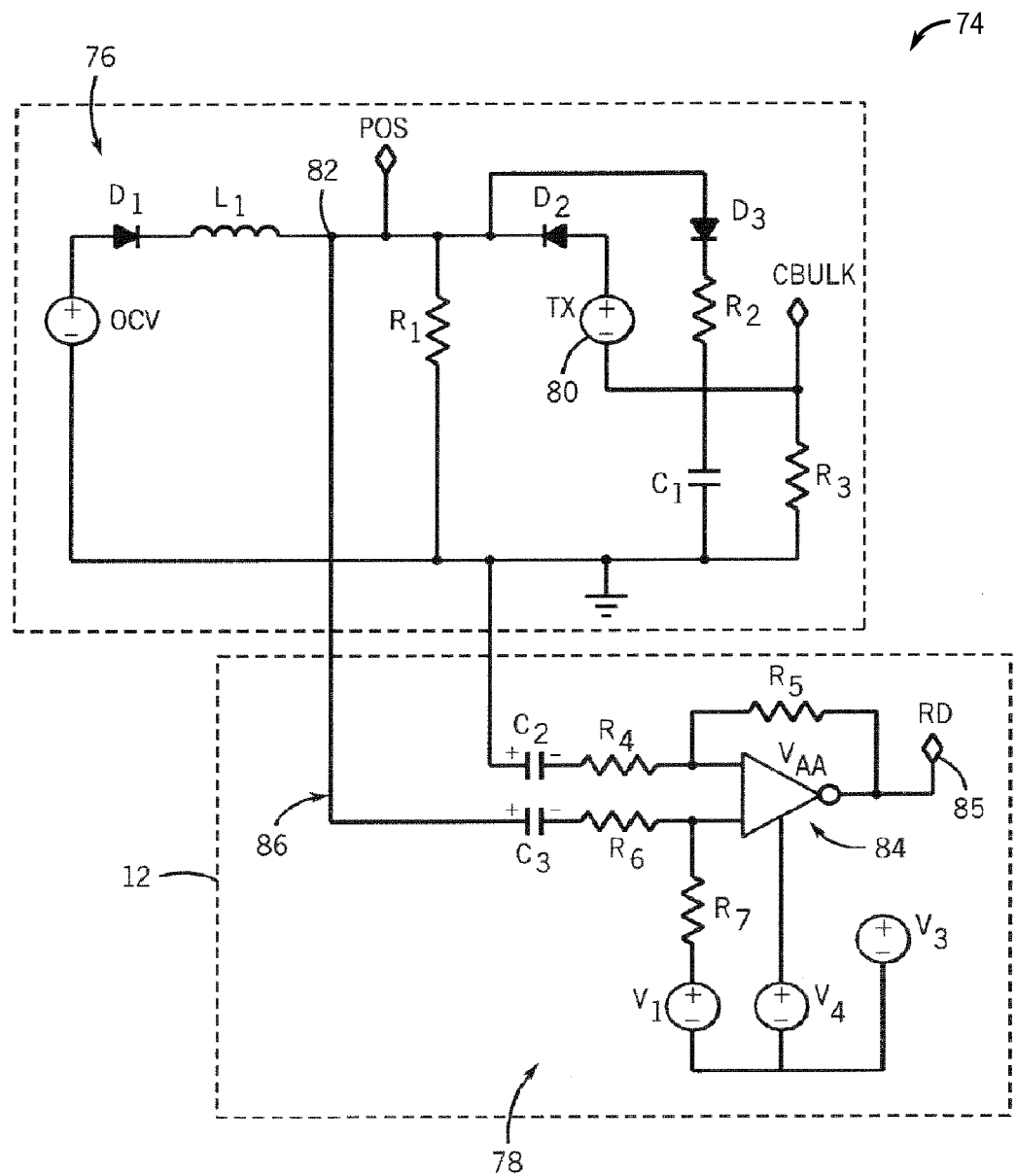
FIG. 5 is an exemplary circuit schematic for providing an OCV offset according to another aspect of the present invention.

Referring now to FIG. 5, an exemplary circuit schematic illustrating another embodiment of the present invention is shown. Circuit 74 provides a general topology for providing an offset voltage to the OCV otherwise present between the power source and the wire feeder during non-welding intervals. In contrast to the periodic disabling of the power source output to receive control data, the circuit of FIG. 5 is designed to provide an offset to the OCV whereby the voltage offset is used to convey control data between the remote wire feeder and the power source. While a particular exemplary circuit will be described, it is recognized that other circuit topologies apart from that specifically illustrated in FIG. 5 may be used to provide a voltage offset for the transmission of control or operational data.

As shown in FIG. 5, the remote transmission of operational and/or control data in accordance with the present invention includes a transmission circuit 76 and a reception circuit 78 connected to one another across weld cable. The transmission circuit 76 resides in the wire feeder 14, FIG. 3, whereas the reception circuit 78, FIG. 5, resides in the power source 12. In the transmission circuit 76, a transmitter 80 is designed to provide a transient signal encoded and/or modulated with operational control data to be transmitted to the controller of the power source. The transient signal has a voltage sufficient to overcome diode D2 such that the voltage at node 82 exceeds the OCV. In this regard, a DC with transient voltage signal is input to linear operational amplifier 84 across weld cable 16, FIG. 3, schematically represented in lead line 86, FIG. 5. The DC portion of input 82 is then filtered out using a capacitive element C3 such that the input to operational amplifier 84 is limited to the transient signal. The operational amplified 84 then provides a single output 85 that is the difference between the pair of inputs to the operational amplifier. Specifically, the output is equal to the transient voltage input to the linear op-amp. As such, for example, if transmitter 80 provides a transient signal of seven volts coupled with a DC voltage of 80 volts, then the output provided by the operational amplifier will have a voltage of seven volts. The data embodied in this seven volts signal may then be processed by the controller to adjust the operating parameters of the power source consistent with those parameters input at the wire feeder.

One skilled in the art will fully appreciate that the resistive values selected for R4, R5, R6, and R7 are relatively arbitrary, but are preferably selected such that a unity gain factor is present at the output 85. Additionally, when the transmitter 80 is not applying providing a transient voltage, the OCV, which is DC, is seen across the weld cable, but filtered out by capacitive elements C2 and C3. As such, a negligible output is provided at 85. Further, during these intervals when the transmitter is not providing a transient voltage, the OCV is used to charge one or more capacitors or other energy storage devices (not shown) in the wire feeder, generally referenced at C_bulk. In this regard, the OCV is used to power the electronics of the wire feeder.

While the present invention has been described with respect to a battery-less wire feeder, it is contemplated that a DC energy source may be used to separately power the electronics of the wire feeder and thus avoid the need for a contactor in the wire feeder. In this regard, a contactor in the power source is used to control the presence of the OCV between the power source and the wire feeder. As such, the contactor in the power source may be closed to create a voltage potential between the welding torch and the power source. This OCV may be temporarily interrupted to receive control commands or used as a communications link between the power source and wire feeder as heretofore described.

Additionally, the present invention contemplates the incorporation of a state machine or other processing device to ignore, for a pre-set period, changes in current at initiation of welding. That is, absent such a state machine, the controller may interpret initial changes in current at welding start-up as an arc outage. As such, the present invention also is directed to the incorporation of a timed loop whereby initial changes in current are ignored for a fixed period of time after, i.e. 100 msec., after welding start-up. Such a system is in contrast to known systems that may be susceptible to false detection of arc outages. With these systems, the power source may try to power down to a non-welding state in response to a rapid change in current, notwithstanding that the operator has initiated a welding event. Accordingly, the controller in the power source is further configured to control the power source to enter a start-up state when the gun trigger is pressed, but not allow transition to an "arc end" state until the pre-set time has expired.

Therefore, the present invention includes a welding system. The welding system includes a battery-less wire feeder designed to feed consumable material to a weld and a power source designed to provide a welding power and having a power output connected to the battery-less wire feeder via a weld cable. The welding system includes a controller to periodically disable the power output and receive power source control commands from the battery-less wire feeder across the weld cable when the power output is disabled.

A MIG welder is disclosed and includes a wire feeder designed to deliver consumable welding wire to a weld. A power source is connected to the wire feeder via a weld cable. The weld cable is designed to carry an OCV thereacross during standby operation of the wire feeder. The MIG welder includes a communications link between the wire feeder and the power source extending across the weld cable. The communications link is designed to translate control commands between the power source and wire feeder manifested in a voltage offset from the OCV.

The invention also includes a method of remotely controlling a welding process. The method includes the steps of periodically disabling an output of a power source designed to provide welding power to a weld and receiving control commands from a wire feeder remote from the power source when the output of the power source is disabled. The method further includes the step of, following reception of the control commands, re-enabling the output of the power source to provide power to the weld at a level consistent with that embodied in the control commands.

As stated above, the present invention is also applicable with non-MIG welding systems such as TIG and stick welders. Further, the aforedescribed circuitry may be implemented to automatically adjust the output of a power source to compensate for losses that occur across weld cables. That is, in some manufacturing and/or industrial settings, the weld is a relatively great distance from the power source. As such, the weld cables may be dozens to over a hundred feet in length. This weld cable length results in losses from the output terminal of the power source to the weld. Simply, the voltage at the output terminals of the power source (where the weld cable is connected to the power source) may be significantly more than the voltage across the weld. Accordingly, the present invention may be used to transmit a voltage feedback signal at the weld to the power source whereupon a controller in the power source compares the voltage at the terminal to the voltage at the weld and adjusts the voltage at the terminal such that after the losses experienced across the weld cables, the voltage at the weld is at the level requested by the user.

As one skilled in the art will fully appreciate, the heretofore description of welding devices not only includes welders, but also includes any system that requires high power outputs, such as heating and cutting systems. Therefore, the present invention is equivalently applicable with any device requiring high power output, including welders, plasma cutters, induction heaters, aircraft ground power units, and the like. Reference to welding power, welding-type power, or welders generally, includes welding, cutting, heating power, or ground power for aircraft. Description of a welding apparatus illustrates just one embodiment in which the present invention may be implemented. The present invention is equivalently applicable with many high power systems, such as cutting and induction heating systems, aircraft ground power systems or any similar systems.

The present invention has been described in terms of the preferred embodiment, and it is recognized that equivalents, alternatives, and modifications, aside from those expressly stated, are possible and within the scope of the appending claims.

What is claimed is:

1. A welding system comprising:
    a wire feeder;
    a power source having a power output connected to the wire feeder via a weld cable to provide a welding power thereacross during a welding process;
    a circuit disposed in the wire feeder, wherein the circuit includes a voltage source and is constructed to provide an open circuit voltage (OCV) from the voltage source across the weld cable during a standby operation of the wire feeder and to provide a transient signal to the open circuit voltage (OCV), the transient signal having control data to adjust operating parameters of the power source; and
    a controller connected to the power source to process the transient signal.

2. The welding system of claim 1 wherein the transient signal is encoded or modulated with control data to be transmitted to the controller.

3. The welding system of claim 1 wherein the controller resides in the power source.

4. The welding system of claim 1 wherein the open circuit voltage (OCV) is used to provide power to a plurality of electronics of the wire feeder by charging one or more energy storage devices when the circuit is not providing the transient signal.

5. The welding system of claim 1 wherein the wire feeder is a battery-less wire feeder.

6. The welding system of claim 5 wherein the circuit is further constructed to provide the open circuit voltage (OCV) and the transient signal to the controller as a combined voltage.

7. A MIG welder comprising:
    a wire feeder to deliver a consumable welding wire to a weld, the wire feeder including a voltage source;
    a power source connected to the wire feeder via a weld cable, the weld cable having an open circuit voltage (OCV) thereacross during a standby operation of the wire feeder, the open circuit voltage (OCV) generated by the voltage source of the wire feeder; and
    a communications link between the wire feeder and the power source extending across the weld cable, the communications link translating control commands between the power source and the wire feeder manifested in a voltage offset from the open circuit voltage (OCV).

8. The MIG welding of claim 7 wherein the power source includes a controller connected to the communications link to control the power source and provide one of current output at a given constant amplitude and voltage output at a given constant amplitude based on control commands received from the wire feeder across the communications link.

9. The MIG welder of claim 7 wherein the wire feeder includes a plurality of electronics designed to control operation of the wire feeder and wherein the plurality of electronics is powered by the open circuit voltage (OCV) during the standby operation of the wire feeder.

10. The MIG welder of claim 7 wherein the communications link is configured to encode the control commands with at least one of voltage encoding and frequency encoding.

11. The MIG welder of claim 7 wherein the communications link is configured to serialize communication between the wire feeder and power source.

12. The MIG welder of claim 7 wherein the wire feeder is connected to a welding gun having a trigger, and wherein the wire feeder includes a contactor assembly designed to close to a conductive state when the trigger is selected to deliver welding power to the welding gun.

13. A method of controlling a welding process, the method comprising the steps of:
    providing an open circuit voltage (OCV) across a weld cable during non-welding intervals, the weld cable connecting a power source with a wire feeder, wherein providing the open circuit voltage (OCV) across the weld cable includes providing the open circuit voltage (OCV) from a voltage source within the wire feeder;
    encoding control commands onto the open circuit voltage (OCV) across the weld cable via a controller within the wire feeder; and
    processing the control commands to adjust operating parameters of the power source.

14. The method of claim 13 further comprising the step of receiving the control commands from a user input connected to the wire feeder.

15. The method of claim 13 further comprising the step of using the open circuit voltage (OCV) to provide power to a plurality of electronics of the wire feeder.

16. The method of claim 13 wherein the control commands are encoded or modulated in a transient signal.

17. The method of claim 16 further comprising the step of filtering out the open circuit voltage (OCV) from the transient signal.

18. The method of claim 16 wherein the transient signal has a voltage sufficient to exceed the open circuit voltage (OCV).

* * * * *